United States Patent
Kuusisto et al.

(10) Patent No.: US 6,447,614 B1
(45) Date of Patent: Sep. 10, 2002

(54) RAW MATERIAL FOR USE IN THE PREPARATION OF PECTIN AND RELATED COMPOUNDS, AND A METHOD FOR THE PREPARATION OF SAME

(75) Inventors: Juhani Kuusisto, Forssa; Irma Christina Lindqvist, Kantvik; Juhani Antila, Espoo, all of (FI)

(73) Assignee: Sohkar Oy, Espoo (FI)

( * ) Notice: Subject to any disclaimer, the term of this patent is extended or adjusted under 35 U.S.C. 154(b) by 0 days.

(21) Appl. No.: 09/486,436

(22) PCT Filed: Aug. 26, 1998

(86) PCT No.: PCT/FI98/00666
§ 371 (c)(1), (2), (4) Date: Mar. 28, 2001

(87) PCT Pub. No.: WO99/10384
PCT Pub. Date: Mar. 4, 1999

(30) Foreign Application Priority Data

Aug. 26, 1997 (FI) .................................... 973501

(51) Int. Cl.[7] ...................... C08B 37/06; C13K 13/00
(52) U.S. Cl. ................... 127/29; 127/34; 536/2
(58) Field of Search .................. 536/2; 127/29, 127/34

(56) References Cited

U.S. PATENT DOCUMENTS 4,831,127 A * 5/1989 Weibel ..................... 536/56
5,008,254 A * 4/1991 Weibel ..................... 514/57

FOREIGN PATENT DOCUMENTS

WO    WO 8403286 A1    8/1984
WO    WO 9730215 A1    8/1997

OTHER PUBLICATIONS

STN International, File CAPLUS, CAPLUS accession No. 1983:33388, Prikryl, Jaroslav et al: "Use of preservatives in agriculture. III. Use of silko in the preservation of green forage and sugar beet pulp" & Agrochemia (Bratislava) (1982), 22(10), 279–9.

STN International, File CAPLUS, CAPLUS accession No. 1980: 109374, Gerbut, A. Ya. et al: "Characteristics of storage of highly pressed beat pup",; & Sakh. Prom–st. (1980), (1), 30–3.

Chemical Abstracts vol. 97 (1982), 90747d.
Chemical Abstracts vol. 98 (1983), 33388.

* cited by examiner

Primary Examiner—David Brunsman
(74) Attorney, Agent, or Firm—Nixon & Vanderhye P.C.

(57) ABSTRACT

The invention relates to a raw material for use in the preparation of pectin and related compounds, the raw material being pressed, stabilized sugar beet pulp subjected to biotechnical pre-treatment. In accordance with the invention the raw material is prepared by pre-treating fresh pressed sugar beet pulp by lowering the pH to a value between 3.5 and 4.5 (preferably 3.9 and 4.3) and subsequently storing the obtained acid pulp in tight, i.e. substantially oxygen-free conditions.

15 Claims, No Drawings

RAW MATERIAL FOR USE IN THE PREPARATION OF PECTIN AND RELATED COMPOUNDS, AND A METHOD FOR THE PREPARATION OF SAME

This application is a 371 of PCT/FI98/00666 filed Aug. 26, 1998.

The invention is related to an improved method for the preparation of organic materials, such as pectin, from sugar beet pulp, from which sugar has been extracted. In accordance with the invention, said sugar beet pulp, from which sugar has been extracted, is pre-treated in a biotechnical process in mildly acidic, deoxidizing conditions prior to hydrolysis or extraction of the desired products. In the biotechnical process the fresh pulp is subjected a deoxidizing, mildly acidic pre-treatment, and the pulp is allowed to stabilize in substantially oxygen-free conditions. The stabilized pulp, which is stable for months in air-tight storage, is used as a raw material in the preparation of sugar beet pectin and related products, such as araban, arabinose, galactan and ferulic acids.

DESCRIPTION OF THE PRIOR ART

Sugar beet hemicellulose is a complex hydrocolloid based on galacturonic acid polymers, the backbone polymer chain comprising regions composed of rhamnose and galacturonic acid for connecting polygalacturonic acid units. Araban and galactan polymer chains are connected to the rhamnose units in these hairy regions.

A galacturonic acid chain is partly acetylated and methylated. Xylose and ferulic acid units are present in the side chains. Pectin can be extracted from sugar beet pulp after mild acid hydrolysis. The composition of pectin depends on the extraction conditions. Some pectic substances, such as arabans, can be alternatively extracted after alkaline hydrolysis. In his patent (U.S. Pat. No. 5,008,254), Michael Weibel describes processes for carrying out the hydrolysis in acid conditions (pH below 4.5) or in alkaline conditions (pH over 9.0) at elevated temperatures.

WO 97/30215 (Wong, E., et al.) discloses use of fermented sugar beet pulp for making paper or cardboard. The preparation of pectin and related compounds is not disclosed.

A conventional process for the preparation of sugar beet pectin is by acid hydrolysis at a pH of about 1.5, followed by neutralization, purification by filtration and precipitation of the pectins with alcohol. McCleary et al. disclose an improved method of preparing araban from fresh sugar beet pulp by extraction with an alkaline lime solution (U.S. Pat. No. 5,250,306). Schiweck et al. prepared L-arabinose from sugar beet araban or beet pulp by hydrolysis in alkaline conditions (U.S. Pat. No. 4,816,078).

The raw material for pectins has been either fresh or dried pulp. Fresh pulp is available only for a short period during the sugar beet season. Consequently, dried pulp has usually been employed.

ADVANTAGES OF THE INVENTION

The use of fresh pulp in the preparation of pectins is not economically feasible due to its limited availability. On the other hand, when the pulp is dried, reactions occur causing colour formation, lower quality of the products obtained from the pulp, and reduced pectin yield. In practice no suitable raw material for sugar beet pectin has been found, and consequently the production and use of this excellent plant hydrocolloid has remained very low.

It has now been discovered that the use of non-dried sugar beet pulp, from which sugar has been removed and which has been subjected to biotechnical pre-treatment in acidic, deoxidizing conditions, results in an improvement in the total process increasing the yields of the desired products from the raw material, which remains stable in storage and is available throughout the year. In the pre-treatment the free sugars still present in said pulp, from which sugar has been removed, are oxidized into organic acids and oxygen is removed, but the pectic substances are not affected. Kept away from light in tight storage, i.e. in substantially oxygen-free conditions, the treated pulp remains stable for months. This stable pulp is an excellent raw material in the preparation of sugar beet pectin and related compounds, such as araban, galactan, L-arabinose, ferulic acids, L-rhamnose, etc.

DESCRIPTION OF THE INVENTION

Fresh, pressed sugar beet pulp, from which sugar has been extracted and whose dry substance content is about 20 to 25 percent by weight, is pre-treated by reducing its pH to about 4, preferably by mixing the pulp with a suitable acid solution. Organic acids, such as formic acid, lactic acid, acetic acid and/or mixtures thereof are effective and easy to use. Commercially available acid mixtures include e.g. "Ensimax", which consists of formic acid and lignosulphonate, and silage (AIV) acid consisting mainly of formic acid. The choice of acid depends on the price and pre-treatment conditions. Very volatile acids, such as formic acid, can cause irritation if used without proper protection. The lime content of the pressed pulp is preferably low, i.e. no lime or aluminium is added to the beet pulp (the cossette) to facilitate the pressing at the final stage of the sugar (saccharose) separation process. After the pressing the temperature of the pulp is about 60° C. and pre-treatment is carried out preferably immediately after the pressing before the pulp cools off.

The pre-treated pulp having a pH of about 4 is preferably packaged in air-tight storage and allowed to stabilize. The tight storage can be e.g. a plastic bag or tube made of polyethene, or what is known as a flat silo. The protection prevents light and air (oxygen) from accessing the treated pulp. The enzyme activity of lactic acid bacteria present in the fresh pulp causes oxidation of free sugars during the stabilization. Organic acids, mainly lactic acid, are formed. The deoxidizing reaction with acid formation as a result removes oxygen and free sugars from the material and prevents further fermentation of the pulp. The obtained pulp, preferably having a pH of 3.5 to 4.5 (most preferably 3.9 to 4.3) and 20 to 27 percent by weight of dry substances, is stored air-tightly at a non-elevated temperature, where it is stable for at least a year. The concept "air-tightly" refers to the pulp being stored in e.g. plastic bags or tubes having a volume of 50 to 200 $m^3$, or a sealed flat silo.

Said stable pulp is preferably prepared from pulp which has been pressed without lime or aluminium addition. The composition of stable pulp is typically: cellulose and lignin about 30 percent by weight, hemicellulose about 70 percent by weight, of which a third is pectin, pH about 4. This raw material is available throughout the year, its preparation is inexpensive and storage easy. The composition of the raw material is advantageous since it does not include low molecular weight sugars, saccharose or glucose.

EXAMPLES

Example 1
Preparation of Pectin

Fresh pressed pulp with no addition of lime and with a dry substance content of about 22% was contacted with a commercial acid mixture "Ensimax" (manufacturer: Kemira Oy, Finland); 4 liters of acid mixture per 1 ton of pressed pulp. Said acid mixture contained 30 percent by weight of formic acid (85%), 20 percent by weight of acetic acid (80%) and 50 percent by weight of lignosulphonate (37%). During mixing the temperature of the pulp was 50 to 60° C. and it was mixed for about 1 minute in a screw mixer. The mixture was packaged in a tight plastic bag made from 0.25 mm polyethene film. The inner surface of the film was black and the outer surface white, providing efficient protection for the pulp against light and oxygen. The pulp was allowed to cool off and stabilize outdoors and the bags were stored in an outdoor storage.

The treated pulp, which had been stored for about 6 months, was used as raw material for sugar beet pectin. The composition of the pulp was as follows: 25 percent by weight of dry substance, Ensimax 0.4 percent by weight, free sugars below 1 percent by weight. Acid hydrolysis was performed first: pH 1.5, temperature 70° C. The hydrolysate was neutralized with sodium carbonate to pH 3, and the solution was separated from insoluble pulp by a decanting centrifuge and filtered by what is known as precoat filtration in the presence of a filtration additive. The filtered solution was concentrated by evaporation below 60° C. to a dry substance content of 9 percent by weight. Pectin was precipitated from the concentrated solution by addition of isopropanol so that the solution contained 75 percent by weight of isopropanol. The precipitated pectin was washed with a 60% isopropanol solution, separated by centrifugation and dried in an air current at 50° C. The yield was 15 percent by weight of pectin of pulp dry substance.

Example 2
Preparation of Araban

Fresh pressed pulp was pre-treated as in Example 1 and the pretreated stable pulp was taken out of storage after 8 months. The pulp was hydrolyzed at pH 12, temperature 95° C., by addition of milk of lime. The hydrolysate was neutralized with carbon dioxide and the pulp was separated from the solution by a filter press. After concentration the araban in the filtrate was separated from salts and other substances by chromatography using a polystyrenedivinylbenzene separation resin. The araban fraction was evaporated and dried. The yield of crude araban was 20 percent by weight.

Example 3
Preparation of L-arabinose

Fresh pressed pulp was pre-treated as in Example 1 and the stable pulp was taken from storage after 7 months. The pulp was hydrolyzed with milk of lime as in Example 2, neutralized, and filtered. The solution was then concentrated by evaporation and the araban was hydrolyzed into L-arabinose by addition of sulphuric acid to pH 0.8 and by heating to 90° C. The hydrolyzed solution was neutralized with sodium hydroxide to pH 6 and the sulphate precipitate formed in the neutralization was removed by filtration. The arabinose fraction was separated by chromatography using a polystyrenedivinylbenzene separation resin in Na form. The arabinose solution was further purified with cation and anion exchange and a colour removal resin (Optipore) and evaporated, whereby the L-arabinose was crystallized. The crystals were separated from the mother liquor by centrifugation. The yield was about 15 percent by weight of L-arabinose of pulp dry substance.

Example 4
Preparation of Araban and Arabinose

Fresh pressed pulp was treated and pectin was precipitated with isopropanol as in Example 1. Free L-arabinose and arabinogalactan-polysaccharide remained in the filtrates and washing solutions generated in the preparation of pectin. Isopropanol was removed from the solution by distillation, whereupon the polysaccharides were separated by chromatography from the L-arabinose using a separation resin either directly or after acid hydrolysis of the arabinogalactan polymers performed to increase the L-arabinose content. The L-arabinose was crystallized from the monosaccharide fraction as in Example 3 and the araban was prepared by purification and drying from the non-hydrolyzed polymer fraction as in Example 2.

What is claimed is:

1. A raw material for use in the preparation of pectin and related compounds, wherein said raw material has been pressed and biotechnically pre-treated by subjecting it to mildly acidic conditions and storing in substantially oxygen-free conditions to obtain stabilized sugar beet pulp.

2. A raw material as claimed in claim 1, wherein said raw material has 20 to 27 percent by weight of dry substance and is substantially free from fermentable sugars.

3. The raw material as claimed in claim 1, wherein said raw material has a pH of 3.5 to 4.5.

4. The raw material as claimed in claim 3, wherein said raw material has a pH of 3.9 to 4.3.

5. A method for the preparation of a raw material for use in the preparation of pectin and related compounds, comprising biotechnically pre-treating fresh pressed sugar beet pulp by:

(1) lowering the pH of the pulp to 3.5 to 4.5, and (2) storing the acid pulp in substantially oxygen-free conditions.

6. The method as claimed in claim 5, wherein the pH of the fresh pressed sugar beet pulp is lowered to about 4.

7. A method of preparing biotechnically pre-treated sugar beet pulp for use in the preparation of pectin and related compounds, said method comprising the steps of:

(1) pre-treating fresh sugar beet pulp, from which sugar has been extracted, by lowering the pH of the pulp to mildly acidic conditions, and thereafter (2) storing the acidified pulp under tight, substantially oxygen-free conditions thereby removing oxygen and free sugars in an induced biotechnical reaction.

8. The method as claimed in claim 7, wherein the pH is lowered to pH 3.5 to 4.5.

9. The method as claimed in claim 8, wherein the pH is lowered to about 4.

10. A method as claimed in claim 8, wherein the pH is lowered by adding an acid or an acid mixture to pressed pulp.

11. A method as claimed in claim 10, wherein the addition of the acid is carried out at a temperature of about 60° C.

12. A method of claim 11, wherein the acid is added immediately after pressing.

13. A method of claim 10, wherein the addition of the acid is carried out at a temperature of 50 to 60° C.

14. A method of claim 13, wherein the acid is added immediately after pressing.

15. The method as claimed in claim 7, wherein said fresh sugar beet pulp has been pressed without addition of lime or aluminum.

* * * * *